United States Patent [19]

Yoshioka et al.

[11] Patent Number: 5,501,607
[45] Date of Patent: Mar. 26, 1996

[54] WATERPROOF STRUCTURE FOR CHARGING CONNECTOR

[75] Inventors: Nobuaki Yoshioka; Toshiaki Hasegawa, both of Shizuoka, Japan

[73] Assignee: Yazaki Corporation, Tokyo, Japan

[21] Appl. No.: 242,623

[22] Filed: May 13, 1994

[30] Foreign Application Priority Data

May 13, 1993 [JP] Japan .................. 5-159925

[51] Int. Cl.⁶ .................................................. H01R 13/44
[52] U.S. Cl. .................................. 439/142; 220/259
[58] Field of Search ............................. 439/142, 136, 439/271; 220/259

[56] References Cited

U.S. PATENT DOCUMENTS

| | | | |
|---|---|---|---|
| 2,054,145 | 9/1936 | Tandy | 220/255 X |
| 4,098,427 | 7/1978 | Duckworth, Jr. | 220/259 OR |
| 4,312,649 | 1/1982 | Fujii et al. | 220/DIG. 33 |
| 4,342,493 | 8/1982 | Grenell | 439/142 OR |

Primary Examiner—Larry I. Schwartz
Assistant Examiner—Daniel Wittels
Attorney, Agent, or Firm—Sughrue, Mion, Zinn, Macpeak & Seas

[57] ABSTRACT

The waterproof structure for a charging connector includes a body cover for opening and closing the opening of a recessed portion formed in a vehicle body, and also includes a waterproof cap for covering a charging connector arranged to project from the bottom surface of the recessed portion. The waterproof cap is journalled openably and closably near a connecting opening formed in the charging connector, and a cam surface is provided around the axis of the journalled portion of the waterproof cap. The waterproof cap can be switchingly moved in its opening and closing directions by an elastic member contactably disposed with the cam surface. When the body cover is closed, then the waterproof cap is pushed by the body cover, thereby closing the connecting opening of the charging connector.

8 Claims, 4 Drawing Sheets

WATERPROOF STRUCTURE FOR CHARGING CONNECTOR

BACKGROUND OF THE INVENTION

1. Field of the Invention

The present invention relates to a waterproof structure for a charging connector and, in particular, to a waterproof structure for a charging connector which is used in an apparatus such as an electric car requiring a charging operation.

2. Description of the Prior Art

Conventionally, in carrying cars used in physical distribution and the like, as well as in electric cars which have attracted public attention in recent years, there is provided in a suitable portion of the car body thereof a charging connector which is a connecting means for charging. Such a charging connector includes a waterproof cap which prevents the entrance of water or dust when not in use so as to prevent generation of a leak or the like. Also, to prevent the charging connector from projecting out from the vehicle body, there is employed a structure in which the charging connector is disposed in a recessed portion of the vehicle body.

Especially, in a waterproof structure for a charging connector when the charging connector is used outdoors (for example, in an electric car or the like), because there is a high possibility that water can enter, a body cover (a cover which forms the outer surface of the car body and can be freely opened and closed) provided on the car body surface side can be used to prevent entrance of water and dust to some degree. There is also provided a waterproof cap in the connecting opening of the charging connector, thereby providing a double waterproof and dustproof structure.

In this type of waterproof structure for a charging connector, for example, as shown in FIG. 7, a waterproof cap 2 is connected to charging connector 1 by means of a chain 3. When not in use (when a charging operation is not preformed), a user fits the waterproof cap 2 into the connecting opening of the charging connector 1, thereby preventing entrance of water and dust. The charging connector 1 is conveniently disposed within a recessed portion 8 and the opening of the recessed portion 8 can be opened and closed by use of a body cover 7. In a different example of the conventional waterproof structure, as shown in FIG. 8, the waterproof cap 2 is arranged such that it can be swung, by means of a pin 4, around a bracket 6 provided in the side portion of the connecting opening of the charging connector 1. Further, for example, one end of a torsion spring 5 wound around the pin 4 is engaged with the bracket 6, and the other end thereof is engaged with the waterproof cap 2. The waterproof cap 2 can be always closed by the force of the torsion spring when a charging operation is not performed. In addition, the cover is closed by the body cover 7.

If the body cover 7 is inadvertently left open, this can be immediately discovered by an operator. Therefore it is unlikely that the operator will forget to close the body cover. However, especially in the structure shown in FIG. 7, if the body cover 7 is closed when the waterproof cap 2 for closing the opening of the charging connector 1 is forgotten to be closed, then the connector is not sealed in a waterproof manner. That is, rainwater and dust can enter the charging connector 1, which results in the failure of the charging connector 1. In this case, to prevent the failure to close the waterproof cap 2, for example, the chain 3 may be extended such that, when the waterproof cap 2 is removed, the cap 2 can be moved out of the recessed portion. In this structure, when the operator tries to close the body cover 7 without closing the waterproof cap 2, then the chain 3 or waterproof cap 2 will be nipped by the body cover 7, which tells the operator that the operator has forgotten to close the waterproof cap 2.

However, even the above-mentioned structure still has a drawback that it requires a troublesome operation to push the excessive portion of the chain into the interiors of the body cover 7. That is, in this structure, even when the waterproof cap 2 is incompletely closed, if the body cover 7 is closed, then it is impossible to confirm the incompletely closed condition of the waterproof cap 2 from the outside.

Also, as shown in FIG. 8, in the structure of the type that the waterproof cap 2 is always forced toward the closing of the charging connector 1 by torsion spring 5, when charging is completed and a charging plug is then removed from the charging connector 1, the waterproof cap 2 is closed automatically. Therefore, there is no possibility that the operator forgets to close the waterproof cap 2.

However, in the charging operation, the operator must open the waterproof cap 2 with one hand to keep the cap in an opened state, while holding a charging plug with the other hand and fitting it with the charging connector 1. This requires operations to be performed clumsily with both hands. Also, in the waterproof cap 2 of this type, if the waterproof cap 2 and charging connector 1 are tightly fitted with each other for perfect waterproofing and dustproofing, then there arises a condition in which the waterproof cap 2 cannot be closed completely by the force of the torsion spring 5. It can also be expected that the force of the torsion spring 5 would be greatly increased. However, an extreme increase in the force reduces the operator's ability to open the waterproof cap 2.

As described above, in the structure shown in FIG. 8, because the fitting between the charging connector 1 and waterproof cap 2 must be relatively loose, the inherent function of the waterproof cap 2 cannot be performed fully, resulting in a structural problem.

SUMMARY OF THE INVENTION

In view of the above-mentioned, the invention aims at eliminating the drawbacks found in the conventional waterproof structures for a charging connector. Accordingly, it is an object of the invention to provide a waterproof structure for a charging connector which is simple, allows for efficient operation, prevents a failure to close a waterproof cap, and is sure to be able to protect the charging connector against water and dust.

In attaining the above object, according to the invention, there is provided a waterproof structure for a charging connector including a body cover for opening and closing the opening of a recessed portion formed in a portion of a vehicle body and a waterproof cap for covering a charging connector provided in the recessed portion, wherein the waterproof cap is openably and closably supported in the neighborhood of a connecting opening of the charging connector, the waterproof cap is arranged such that it can be switchingly energized in its closing and opening directions, and, when the body cover is moved in its closing direction, the waterproof cap is pressed by the body cover, thereby closing the connecting opening of the charging connector.

Also, the above object of the invention can also be accomplished by a structure in which the switchable moving of the waterproof cap in its closing and opening directions can be generated by a cam surface disposed around the axis of the support portion of the waterproof cap and an elastic member disposed to be contactable with the cam surface, or by a structure in which a pressure member for elastically pressing against the waterproof cap in its closing direction while the body cover is being closed is provided inside of the body cover or outside of the waterproof cap, or by a structure in which the waterproof cap and body cover are connected with each other by a connecting member and the waterproof cap can be opened and closed in linking with the opening and closing movements of the body cover.

According to the above-mentioned waterproof structure of the invention, the waterproof cap is maintained in its opened state by the force of an elastic member such as a leaf spring and the like acting on the cam surface when the cap is opened; on the other hand, when it is situated on the charging connector, the waterproof cap is energized in its closing direction by the action of the elastic member acting on the cam surface; and, while the body cover is closed, the waterproof cap is pressed in its closing direction by the inside of the body cover. That is, the present structure assures to close the waterproof cap completely and thus assures to waterproof and dustproof the charging connector perfectly.

Also, according to the structure of the invention, even if an operator forgets to close the waterproof cap, by means of an operation to close the body cover, the body cover presses down the waterproof cap. Thus, the waterproof cap is automatically closed on the charging connector because of the action of the leaf spring. This insures that the waterproof cap will be fully closed.

Further, according to the structure in which a link member is interposed between the waterproof cap and body cover, the waterproof cap can be opened in linking with an operation to open the body cover. Also, according to the structure in which an elastic member is interposed between the body cover and waterproof cap, the waterproof cap can be pressed elastically by the elastic member to thereby insure that the waterproof cap will be fully closed.

BRIEF DESCRIPTION OF THE DRAWINGS

The present invention is illustrated in the following drawings, in which.

DETAILED DESCRIPTION OF THE PREFERRED EMBODIMENTS

Description will be given hereinbelow of an embodiment of a waterproof structure for a charging connector according to the invention with reference to FIGS. 1 to 5.

Figure 1:
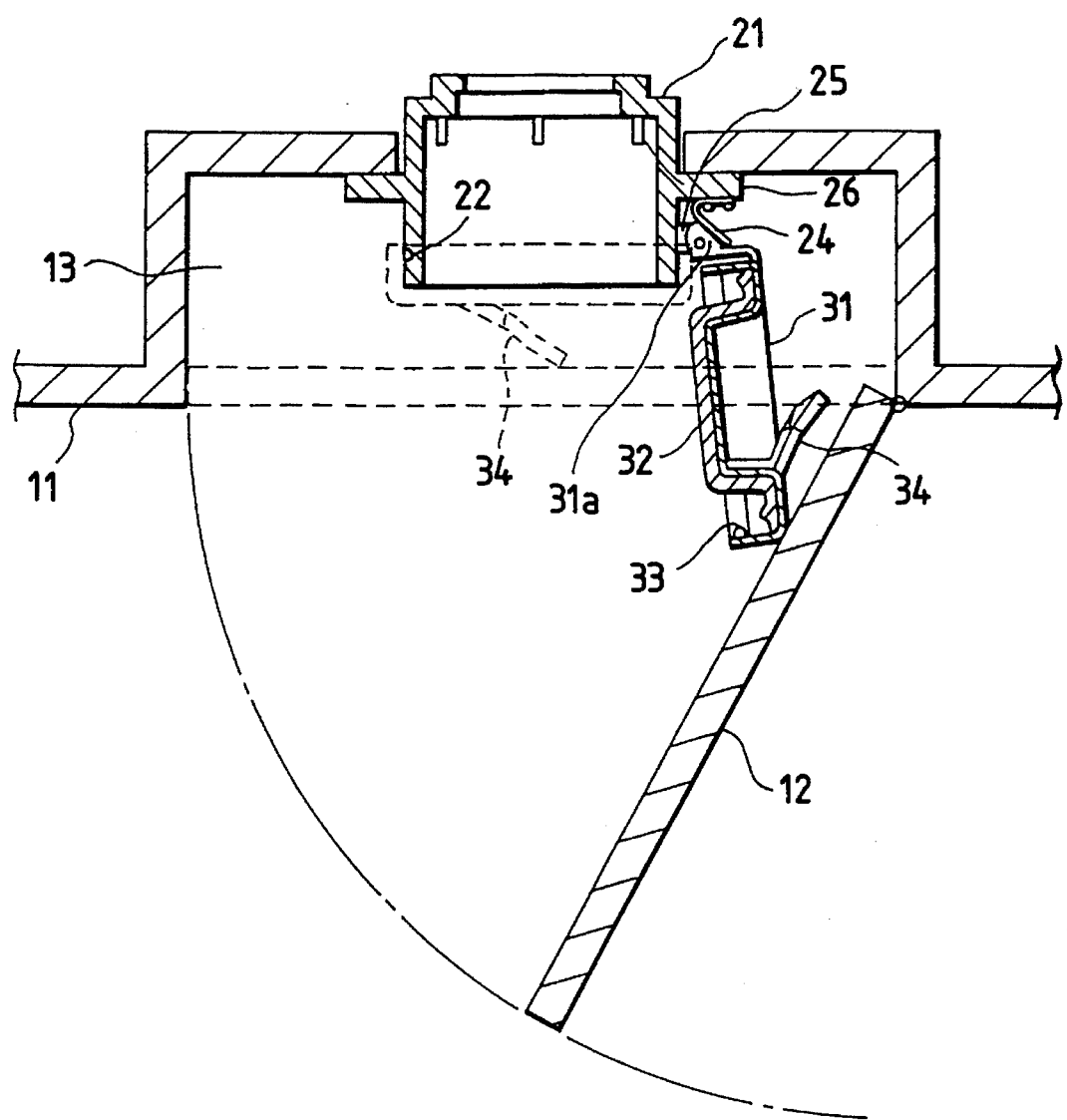
FIG. 1 is a schematic horizontal section view of a first embodiment of a waterproof structure according to the invention.
Figure 2:
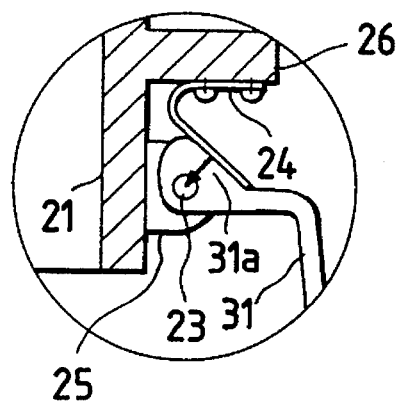
FIG. 2 is an explanatory view of the action of a leaf spring on the cam portion of the waterproof cap in the respective opening and closing angles of the waterproof cap employed in the first embodiment of the invention.
Figure 3:
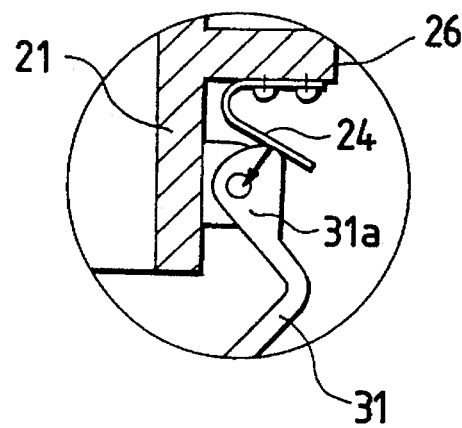
FIG. 3 is an explanatory view of the action of a leaf spring on the cam portion of the waterproof cap in the respective opening and closing angles of the waterproof cap employed in the first embodiment of the invention.
Figure 4:
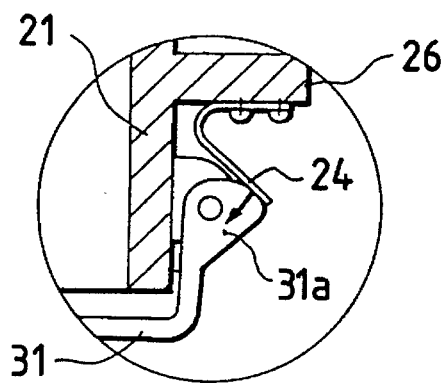
FIG. 4 is an explanatory view of the action of a leaf spring on the cam portion of the waterproof cap in the respective opening and closing angles of the waterproof cap employed in the first embodiment of the invention.
Figure 5:
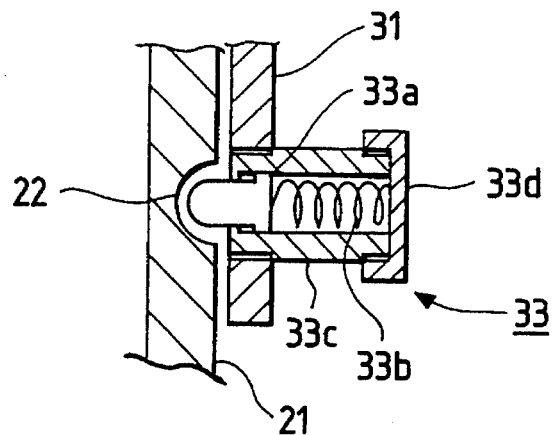
FIG. 5 is a schematic section view of the structure of a locking elastic projection provided in the waterproof cap to be fitted into a securing hole formed in a charging connector.

FIG. 1 is a schematic horizontal section view of a first embodiment of a waterproof structure using a waterproof cap according to the invention. FIGS. 2 to 4 are respectively explanatory views of the action force of a leaf spring to be applied to a cam portion of the waterproof cap in the respective opening and closing angles of the waterproof cap, and FIG. 5 is a section view of the structure of a locking elastic projection which is provided in the waterproof cap and is fittable into a securing hole formed in the charging connector.

In FIG. 1, a recessed portion 13 is formed in a portion of a vehicle body 11 and an opening formed in the recessed portion 13 can be opened and closed by a body cover 12 which is pivotally mounted to the edge of the recessed portion. In the recessed portion 13, there is disposed a charging connector 21 in such a manner that it can be projected out according to cases and, in close proximity to the charging connector 21, a waterproof cap 31 is mounted which can be opened and closed in the same direction in which the body cover 12 is opened and closed.

A bracket 25 is provided on the side portion of the charging connector 21 and a pin 23 is fitted with the bracket 25. The waterproof cap 31 can be swung around the pin 23 and includes a cam portion 31a having a cam surface which is formed in a suitable shape. A leaf or leaf spring 24, which has a substantially V- or U-shaped side surface, is mounted on a flange portion 26 of the charging connector 21 and is arranged such that it is contactable with the cam portion 31a.

Although a connecting terminal is actually disposed within the charging connector 21, the illustration thereof is omitted here.

Description will now be given below of the operation to be performed by the cam portion 31a and leaf spring 24.

When the waterproof cap 31 is fully opened (see FIG. 2), the force of the leaf spring 24 is applied toward the pin 23 or toward the cam leading end side (upper side in FIG. 2) rather than the pin according to the contact conditions between the waterproof cap 31 and the cam portion 31a, so that the waterproof cap 31 is kept open.

When the waterproof cap 31 is closed from its open state, in the beginning of the closing operation thereof, the waterproof cap 31 receives from the leaf spring 24 a force which repels the closing operation. As shown in FIG. 3, when the waterproof cap 31 is slightly closed, the leaf spring 24 acts on the next contact portion (in the drawings, the surface that is most remote from the pin) of the cam portion 31a, thereby increasing the spring force to some extent. However, since the direction of action thereof extends in the direction of the pin 23, little force is being applied to the waterproof cap 31 in the opening and closing directions thereof. That is, this is a balanced intermediate state in which the direction of force of the leaf spring 24 can be switched between the opening and closing directions. It should be noted that such an intermediate state as shown in FIG. 3 occurs in a very narrow range in the middle of the opening and closing operation; that is, it is just a metastable state.

On the other hand, in such a state as shown in FIG. 4 in which the waterproof cap 31 is closed, the force of the leaf spring 24 acts around the pin 23 to close the waterproof cap 31. As a result of this, the waterproof cap 31 receives a force in a direction to bring a waterproof packing 32 attached to the inside of the waterproof cap 31 into close contact with the charging connecter 21.

Also, the waterproof cap 31 includes an elastic projection 33 for locking on the opposite side to the mounting side thereof, so that the projection 33 is projected inwardly of the cap 31 and is engageable into a securing hole 22 formed on the charging connector 21 side thereof. Due to this, when the waterproof cap 31 is closed, the locking elastic projection 33 is fitted into the securing hole 22. This enables the waterproof cap 31 to be secured in its closed state, and makes it possible for a user to recognize that the waterproof packing is surely closed according to an elastic sound or a response occurring when the projection 33 is inserted into the securing hole 22.

The locking elastic projection 33, as shown in FIG. 1, may be simply projected internally of the waterproof cap 31. Alternatively, the elastic projection 33 may be arranged as shown in FIG. 5. A projection 33a and a spring 33b are inserted into a cylinder 33c and the cylinder 33c is then covered with a spring storing cover 33d to form one united structure. The one united structure is threadedly engaged with, for example, the internal thread portion of the waterproof cap 31.

To open the waterproof cap 31, a knob 34 provided on the outer surface of the cap 31 can be pulled by hand. On the other hand, to close the waterproof cap 31, the waterproof cap 31 may be pressed by hand and, alternatively, since the knob 34 can be brought into contact with the inner surface of the body cover 12, the waterproof cam 31 can be closed completely only by closing the body cover 12. That is, even when a user happens to forget to close the waterproof cap 31 or the waterproof cap 31 is incompletely closed, the waterproof cap 31 is pushed down and closed in an operation to close the body cover 12. In addition, when the body cover 12 is closed, the upper end portion of the knob 34 is pressed by the inner surface of the body cover 12, thereby completely preventing the waterproof cap 31 from failing to close. The knob 34 is mounted in a cantilever manner and, therefore, it can be provided with proper elasticity.

Next, description will be given below of a second embodiment of a waterproof structure for a charging connector according to the invention with reference to FIG. 6.

Figure 6:
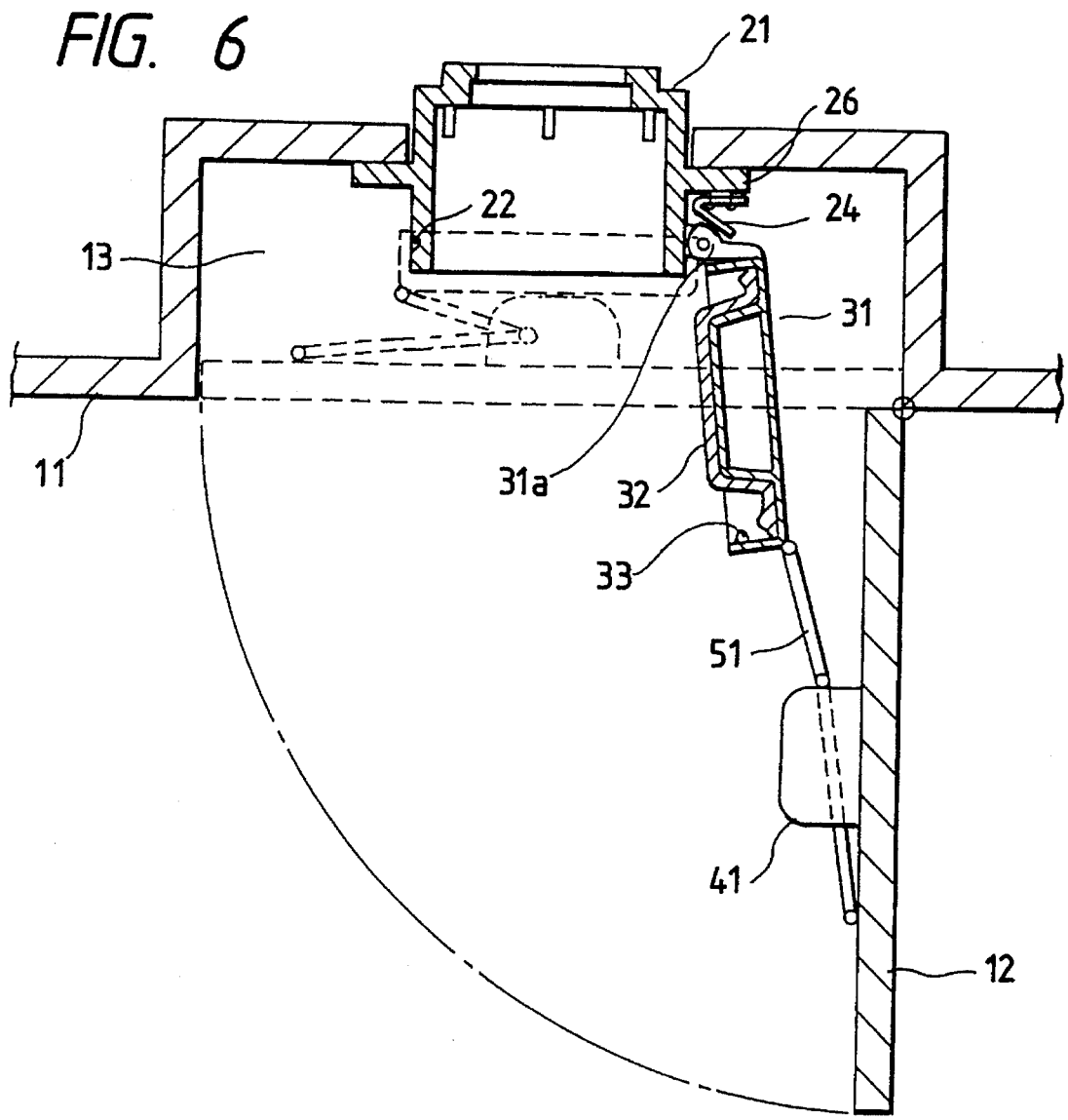
FIG. 6 is a schematic horizontal section view of a second embodiment of a waterproof structure according to the invention.
Figure 7:
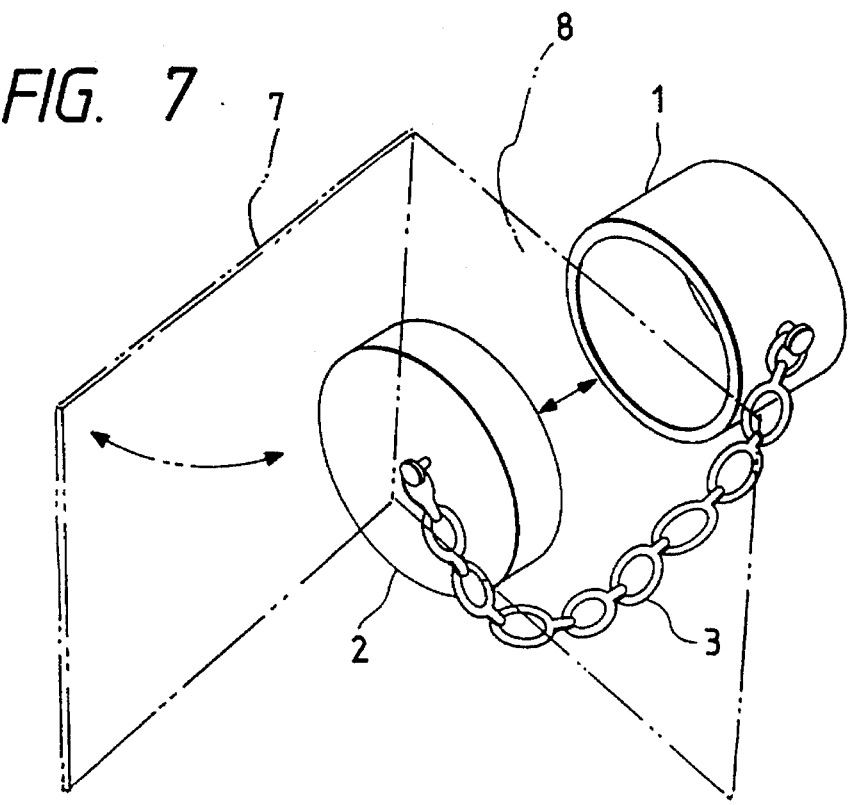
FIG. 7 is a perspective view of a conventional waterproof cap.
Figure 8:
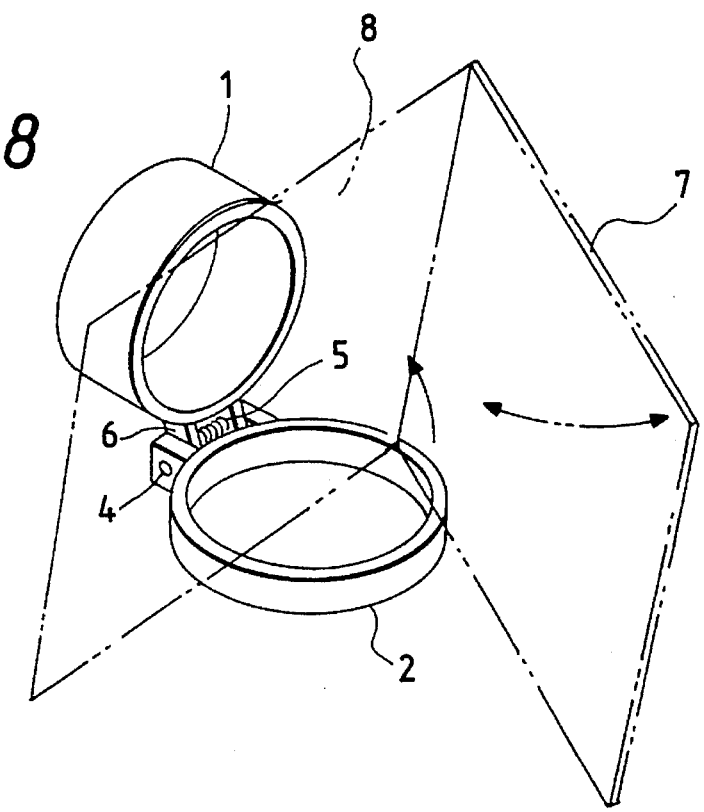
FIG. 8 is a perspective view of another conventional waterproof cap.

FIG. 6 is a schematic horizontal section view of a second embodiment of a waterproof structure using a waterproof packing according to the invention. In the second embodiment, the same components thereof as in the first embodiment are given the same designations respectively, and thus the description thereof is omitted here.

Within the body cover 12 there is provided an elastic member 41 having suitable size. When the waterproof cap 31 is closed on the charging connector 21 and the body cover 12 is closed, then the elastic member 41 pushes against the waterproof cap 31 to thereby close the charging connector 21 positively, whereby the charging connector 21 can be waterproofed and dustproofed.

A structure is employed in which a point distant from the center of swing of the waterproof cap 31 is linked with a suitable point existing within the body cover 12 by a link member 51. The link member 51 includes a hinge in the middle stage thereof and links the above-mentioned two points with each other. Further, in the elastic member 41, there is formed a groove which is adapted to receive the link member 51, so that the link member 51 and elastic member 41 do not interfere with each other when the body cover 12 is opened and closed. However, when the elastic member 41 and link member 51 are provided at their respective positions where they do not interfere with each other, the above-mentioned groove is not necessary.

With this structure, if the body cover 12 is opened, then the link member 51 pulls and opens the waterproof cap 31 to thereby be able to connect a feeder line with the charging connector 21 immediately, so that the workability of the structure can be improved to a great extent.

Although, in the first and second embodiments, description is omitted of a structure for securing the body cover 12 in its closed state, of course, it is preferred to arrange the body cover 12 such that it can be secure with the recessed portion 13 thereof closed. However, this structure is not limited to a special one but various structures can also be employed.

Also, the present invention is not limited to the above-mentioned embodiments at all but, for example, various charges in the shape and arrangement of the leaf spring, cam portion, waterproof cap, elastic member and the like may be resorted to without departing from the spirit of the invention or the scope of the subjoined claims.

As has been described heretofore, according to the invention, when the waterproof cap is opened, it can be maintained in the open state. On the other hand, when it is positioned on the charging connector, the waterproof cap is pushed in its closing direction. Also, when the body cover is closed, the waterproof cap is pushed in its closing direction by the inside of the body cover. This makes it possible to close the waterproof cap completely and thus to protect the charging connector from water and dust. Also, even when a waterproof cap closing operation is forgotten, by means of an operation to close the body cover, the body cover pushes down the waterproof cap, thereby closing the waterproof cap automatically. Therefore, the invention is sure to prevent a failure of the closing of the waterproof cap.

What is claimed is:

1. A waterproof structure for an electrical charging connector, comprising:

a body cover for opening and closing an opening of a recessed portion formed in a vehicle body;

a waterproof cap for covering a charging connector provided in the recessed portion; and moving means for alternately urging said cap in its opening and closing directions depending on the angular position of said waterproof cap, wherein said waterproof cap is journalled openably and closably in close proximity to a connecting opening of said charging connector, and, when said body cover is moved in its closing direction, said waterproof cap is automatically pushed by said body cover in a closing direction thereby closing said connecting opening of said charging connector.

2. A waterproof structure for a charging connector as set forth in claim 1, wherein said moving means comprises:

a cam surface disposed around the axis of said journalled portion of said waterproof cap; and an elastic member contactably disposed with said cam surface.

3. A waterproof structure for a charging connector as set forth in claim 1, further comprising a pressure member, disposed on at least one of an internal surface of said body cover and an external surface of said waterproof gap, for elastically pushing against said waterproof cap in its closing direction while said body cover is closed.

4. A waterproof structure for a charging connector as set forth in claim 1, further comprising a link member, linking said waterproof cap and said body cover, wherein said waterproof cap is openable and closable in linking with respective opening and closing movements of said body cover.

5. A waterproof structure for a charging connector as set forth in claim 2, further comprising a pressure member, disposed on at least one of an internal surface of said body cover and an external surface of said waterproof gap, for elastically pushing against said waterproof cap in its closing direction while said body cover is closed.

6. A waterproof structure for a charging connector as set forth in claim 2, further comprising a link member, linking said waterproof cap and said body cover, wherein said waterproof cap is openable and closable in linking with respective opening and closing movements of said body cover.

7. A waterproof structure for a charging connector as set forth in claim 3, further comprising a link member, linking said waterproof cap and said body cover, wherein said waterproof cap is openable and closable in linking with respective opening and closing movements of said body cover.

8. A waterproof structure for a charging connector as set forth in claim 1, wherein said body cover and said waterproof cap are opened in the same direction.

* * * * *